(No Model.)
A. D. PRINGLE.
SPEED GEARING FOR BICYCLES.
No. 517,063. Patented Mar. 27, 1894.
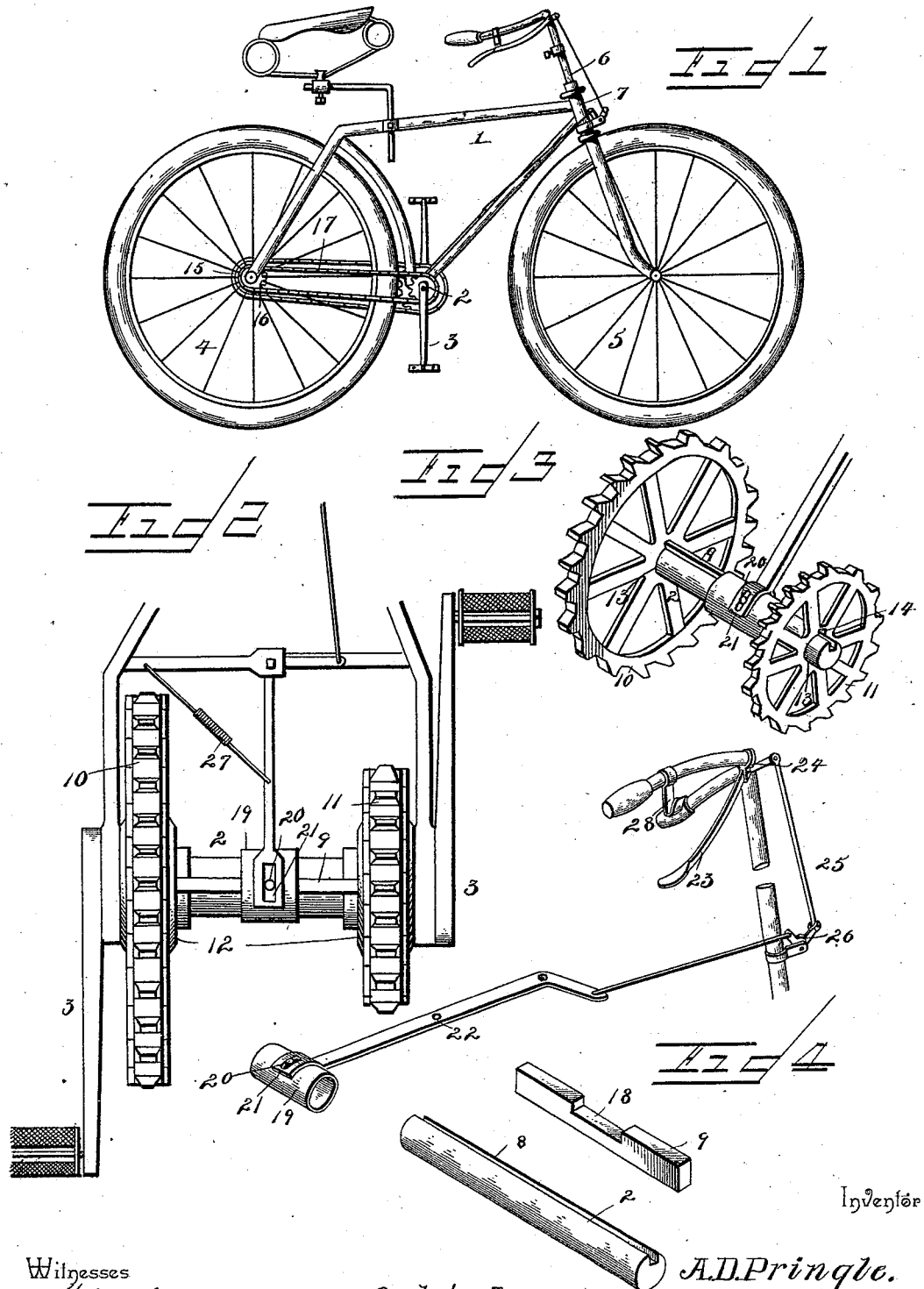

UNITED STATES PATENT OFFICE.

ARTHUR D. PRINGLE, OF WEST BROWNSVILLE, PENNSYLVANIA.

SPEED-GEARING FOR BICYCLES.

SPECIFICATION forming part of Letters Patent No. 517,063, dated March 27, 1894.

Application filed April 12, 1893. Serial No. 470,127. (No model.)

*To all whom it may concern:*

Be it known that I, ARTHUR D. PRINGLE, residing at West Brownsville, in the county of Washington, State of Pennsylvania, have invented a new and Improved Speed-Gearing for Bicycles; and I do hereby declare that the following is an exact description thereof, reference being had to the accompanying drawings and figures of reference thereon.

My invention relates to multiple gearing whereby either the power or the speed of the pedal shaft may be multiplied in its transmission to the driving wheel.

The object of my invention is to provide a simple, compact and efficient mechanism having suitable means of adjustment under the control of the rider whereby the change from power to speed gearing, and the reverse, may be accomplished while the machine is in motion; and furthermore, to provide a device which can be applied to any bicycle or similar vehicle of ordinary construction without necessitating alterations in the relative disposition of the parts of the machine.

Further objects and advantages of my invention will appear in the following description, and the novel features thereof will be particularly pointed out in the appended claim.

In the drawings: Figure 1 is a side view of a safety bicycle provided with a multiple gearing embodying my invention. Fig. 2 is a plan view of the gearing, shown applied to the frame work of the machine. Fig. 3 is a detail view in perspective of the gearing detached. Fig. 4 is a detached view of the adjusting mechanism with the members thereof disconnected.

Similar numerals of reference indicate corresponding parts in all the figures of the drawings.

Fig. 1 represents a bicycle of the ordinary construction provided with a diamond frame 1 and having a pedal shaft 2, pedals 3, driving wheel 4, steering wheel 5, and rotatable head 6 which is mounted in a sleeve or bearing 7 at the front end of the frame. The pedal shaft is provided with a longitudinally disposed groove or channel 8, adapted for the reception of a slidable feather 9, and mounted loosely upon the pedal shaft, at its extremities, are gears 10 and 11, of which the former is larger than the latter, said gears being spaced apart and being held from lateral displacement by the collars 12. The gears are provided at their centers, and communicating with their bearings, 13, with notches 14, either of which may be aligned with the groove 8 in the pedal shaft, to receive the outer edge of the feather 9. When the feather is disengaged from said notch the gear may rotate loosely and idly upon the pedal shaft. The shaft of the driving wheel is provided with fixed gears 15 and 16, which are connected, respectively, to the loose gears 10 and 11 by the chains 17. The feather 9 is provided at its center with a seat or saddle 18, the floor of which is flush with the surface of the pedal shaft, and seated therein and surrounding the shaft is a sleeve 19 which holds the feather in place in its groove and is provided upon opposite sides with studs 20 which fit in slots 21 formed in the bifurcated end of the bell crank lever 22. The operating lever 23 is pivotally connected by means of a clip 24 to the handle bar of the machine to be within easy reach of the hand of the rider, and the movement of this lever is communicated to the bell crank lever 22 through the intermediate connections 25, which in the construction illustrated include an angle lever 26 but which may include an additional lever or levers according to the construction of the bicycle or other vehicle. The bell crank lever is spring-actuated, being connected to one end of the coiled spring 27 whereby when the bell crank lever is released the power of the spring, communicated through the sleeve 19, causes the feather to engage the larger gear 10, which is the speed increasing gear. The feather is disengaged from said speed increasing gear by elevating the free end of the operating lever, and when said lever is at an intermediate point of its movement the feather is out of engagement with both gears, thus enabling the rider to proceed upon down grades without removing his feet from the pedals.

To adjust the mechanism for power, the operating lever is elevated and engaged in the catch 28, which is clearly shown in Fig. 4, in which position the feather is in engagement with the gear 11. To change from power to speed gearing it is only necessary to disengage the operating lever from the catch 28, the spring 27 moving the parts to engage th feather with the gear 10.

From the above description it will be obvious that the construction of my improved gearing is simple and is capable of universal application, inasmuch as the means for adjusting are capable of modification to suit frames of any form. Furthermore, the adjustment for either speed or power may be accomplished quickly and without necessitating the removal of either hand from the handle bar of the machine.

Various changes in the form, proportion, and minor details of construction may be resorted to without departing from the spirit or sacrificing the advantages of the invention.

Having described my invention, what I claim is—

The combination with a driving-wheel carrying duplicate fixed gears, of a pedal-shaft provided with a longitudinal groove, gears loosely mounted upon the pedal-shaft near its extremities and held from displacement by collars fixed to the shaft, a feather slidably fitted in said groove to engage a notch in the hub of either of the loose gears, projecting at its outer edge beyond the surface of the shaft and having an intermediate angular seat or saddle the floor of which is flush with the surface of the shaft, a sleeve slidably fitted upon the shaft within said seat or saddle whereby the shaft is capable of rotating within the sleeve, a bell-crank lever having one arm bifurcated and slotted to engage studs upon opposite sides of said sleeve, an actuating spring connected to the other arm of said bell-crank lever to normally hold the feather in engagement with the notch of one of the loose gears, an operating lever pivotally connected to the frame of the machine, connections between the operating lever and the bell-crank lever, and a catch located in the path of the free arm of the operating lever to engage the latter when elevated to hold the feather in engagement with the notch of the other loose gear, substantially as specified.

ARTHUR D. PRINGLE.

Witnesses:
G. W. BROCK,
W. C. DWYER.